US012726562B2

(12) United States Patent
Agrawal et al.

(10) Patent No.: US 12,726,562 B2
(45) Date of Patent: Sep. 1, 2026

(54) DEVICE CONFIGURATION BASED ON DETECTED USER STATE

(71) Applicant: Motorola Mobility LLC, Chicago, IL (US)

(72) Inventors: Amit Kumar Agrawal, Bangalore (IN); Ankur Varshney, Bangalore (IN); Bhashyam Krishnama Naidu Sukumar, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 342 days.

(21) Appl. No.: 18/455,788

(22) Filed: Aug. 25, 2023

(65) Prior Publication Data

US 2025/0071199 A1 Feb. 27, 2025

(51) Int. Cl.
*H04M 1/72463* (2021.01)
*H04M 1/72403* (2021.01)
*H04M 1/72454* (2021.01)

(52) U.S. Cl.
CPC ... *H04M 1/72463* (2021.01); *H04M 1/72403* (2021.01); *H04M 1/72454* (2021.01)

(58) Field of Classification Search
CPC ......... H04M 1/72463; H04M 1/72403; H04M 1/72454
See application file for complete search history.

(56) References Cited

U.S. PATENT DOCUMENTS 11,043,099 B1 6/2021 Darak et al.
11,211,095 B1 * 12/2021 Verbeke ................ B60K 35/26
12,373,508 B2 7/2025 Agrawal et al.
2014/0028542 A1 * 1/2014 Lovitt .................... G06F 3/017 345/156
2015/0026708 A1 1/2015 Ahmed et al.
2015/0053066 A1 * 2/2015 Hampiholi ............ B60K 35/10 84/602
2015/0070516 A1 * 3/2015 Shoemake ......... H04N 21/4542 348/207.11
2015/0358415 A1 * 12/2015 Cronin ................. H04L 67/535 709/217

(Continued)

FOREIGN PATENT DOCUMENTS

CN 104516806 A * 4/2015
CN 108650532 A * 10/2018 ........... H04N 21/252

OTHER PUBLICATIONS

"Notice of Allowance", U.S. Appl. No. 18/455,778, filed Apr. 30, 2025, 21 pages.

(Continued)

*Primary Examiner* — Farid Seyedvosoghi
(74) *Attorney, Agent, or Firm* — FIG. 1 Patents

(57) ABSTRACT

In aspects of device configuration based on detected user state, a mobile device includes device applications that can be initiated to display visual content or emit audio content in a secondary user mode of operation of the mobile device. The mobile device implements an access control module to detect a user state of a user accessing one or more of the device applications in the secondary user mode. The access control module can then categorize a device application as restricted based on the user state being a detected first state, or categorize the device application as allowed based on the user state being a detected second state.

20 Claims, 10 Drawing Sheets

(56) References Cited

U.S. PATENT DOCUMENTS

| | | | | |
|---|---|---|---|---|
| 2016/0085950 | A1* | 3/2016 | Chen | G06V 40/172 726/28 |
| 2016/0323643 | A1* | 11/2016 | Panchaksharaiah | H04N 21/4753 |
| 2018/0181566 | A1* | 6/2018 | Lee | H04N 21/4147 |
| 2018/0193652 | A1* | 7/2018 | Srivastava | A61B 5/4836 |
| 2019/0114060 | A1* | 4/2019 | Resudek | G06F 18/22 |
| 2022/0224963 | A1 | 7/2022 | Herz et al. | |
| 2022/0269388 | A1* | 8/2022 | Sastry | H04M 1/64 |
| 2025/0068684 | A1 | 2/2025 | Agrawal et al. | |

OTHER PUBLICATIONS

"Corrected Notice of Allowability", U.S. Appl. No. 18/455,778, filed Jun. 9, 2025, 2 pages.

Agrawal, Amit Kumar , et al., "Pursuant to MPEP § 2001.06(b) the applicant brings the following co-pending application to the Examiner's attention:", U.S. Appl. No. 18/455,778, filed Aug. 25, 2023, 46 pages.

"Non-Final Office Action", U.S. Appl. No. 18/455,778, filed Nov. 21, 2024, 28 pages.

* cited by examiner

Display visual content for viewing in a secondary user mode of device operation
602

Detect a user state of a user reacting to the visual content
604

Detect a change in the user state of the user during displaying the visual content
606

Replace the display of the visual content with different visual content
608

Restrict the displaying of the visual content based on the change in the user state
610

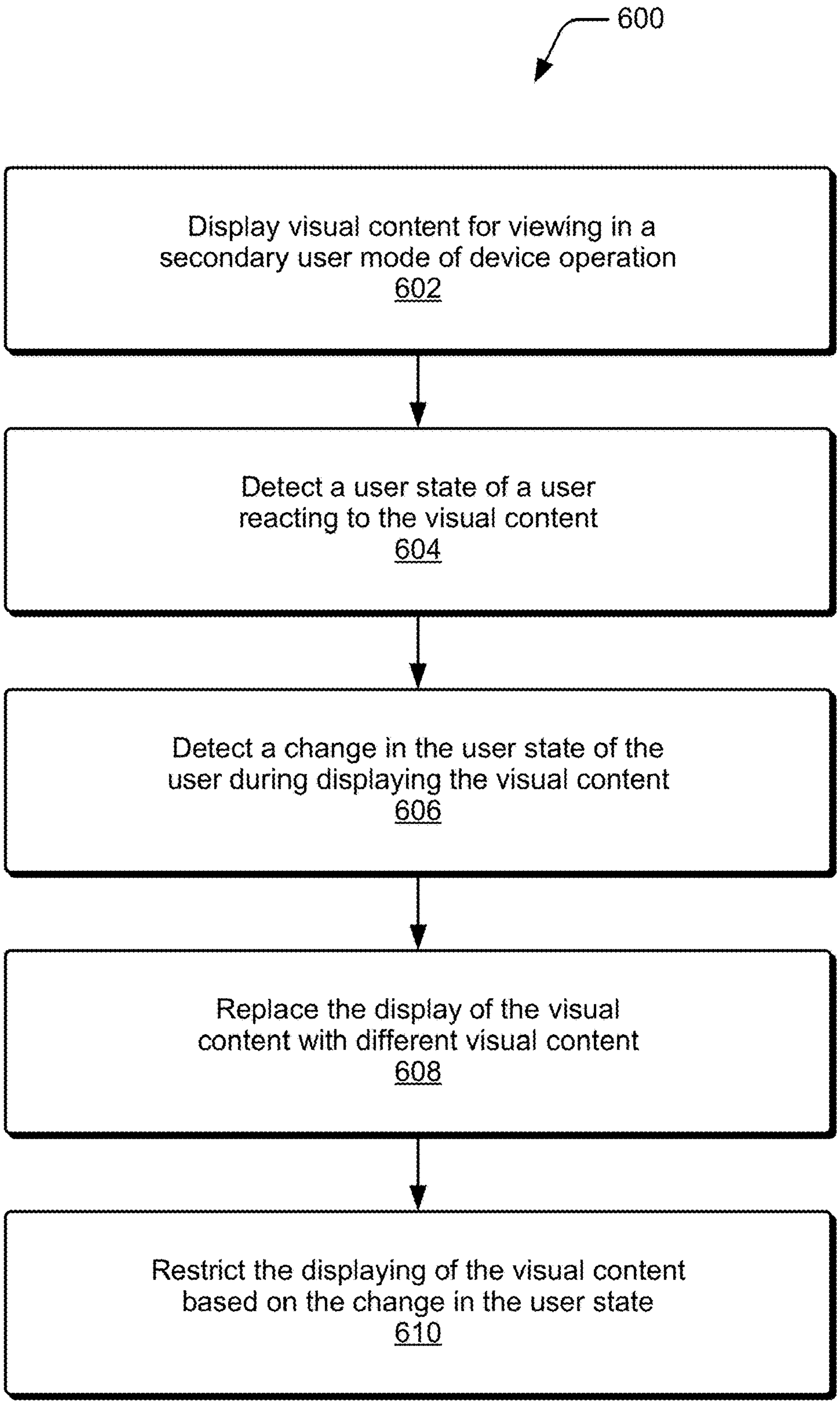

FIG. 6

Allow use of one or more device applications that display visual content and/or emit audio content
702

Categorize a detected user state as one of constructive or destructive
704

Allow use of a first device application associated with the detected user state being constructive
706

Restrict use of a second device application associated with the detected user state being destructive
708

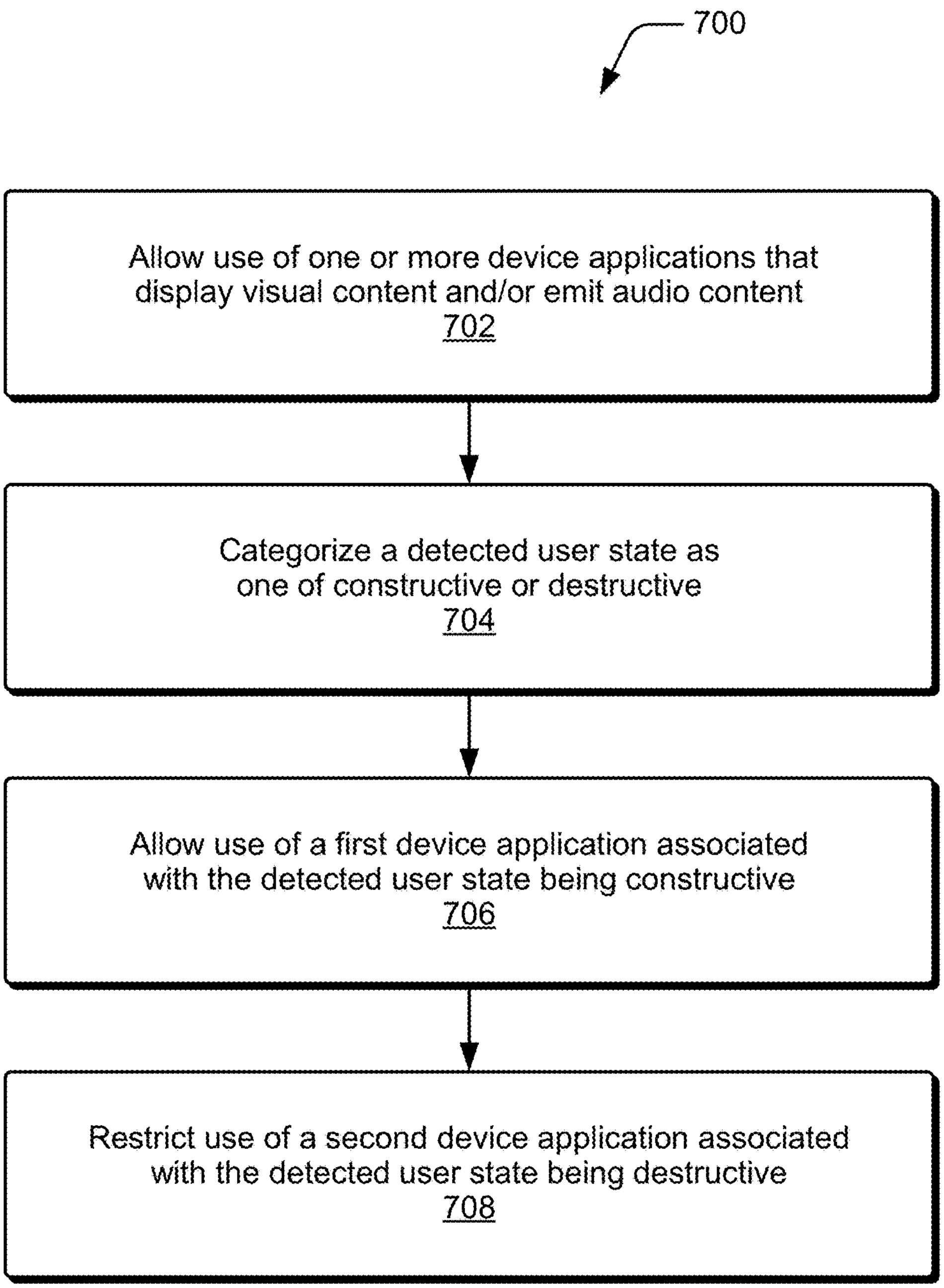

FIG. 7

Execute one or more device applications to display visual content and/or emit audio content in a secondary user mode of device operation
802

↓

Detect one or more user states of a user accessing the device applications in the secondary user mode
804

↓

Categorize a device application as restricted based on a user state being a detected first state
806

↓

Categorize the device application as allowed based on the user state being a detected second state
808

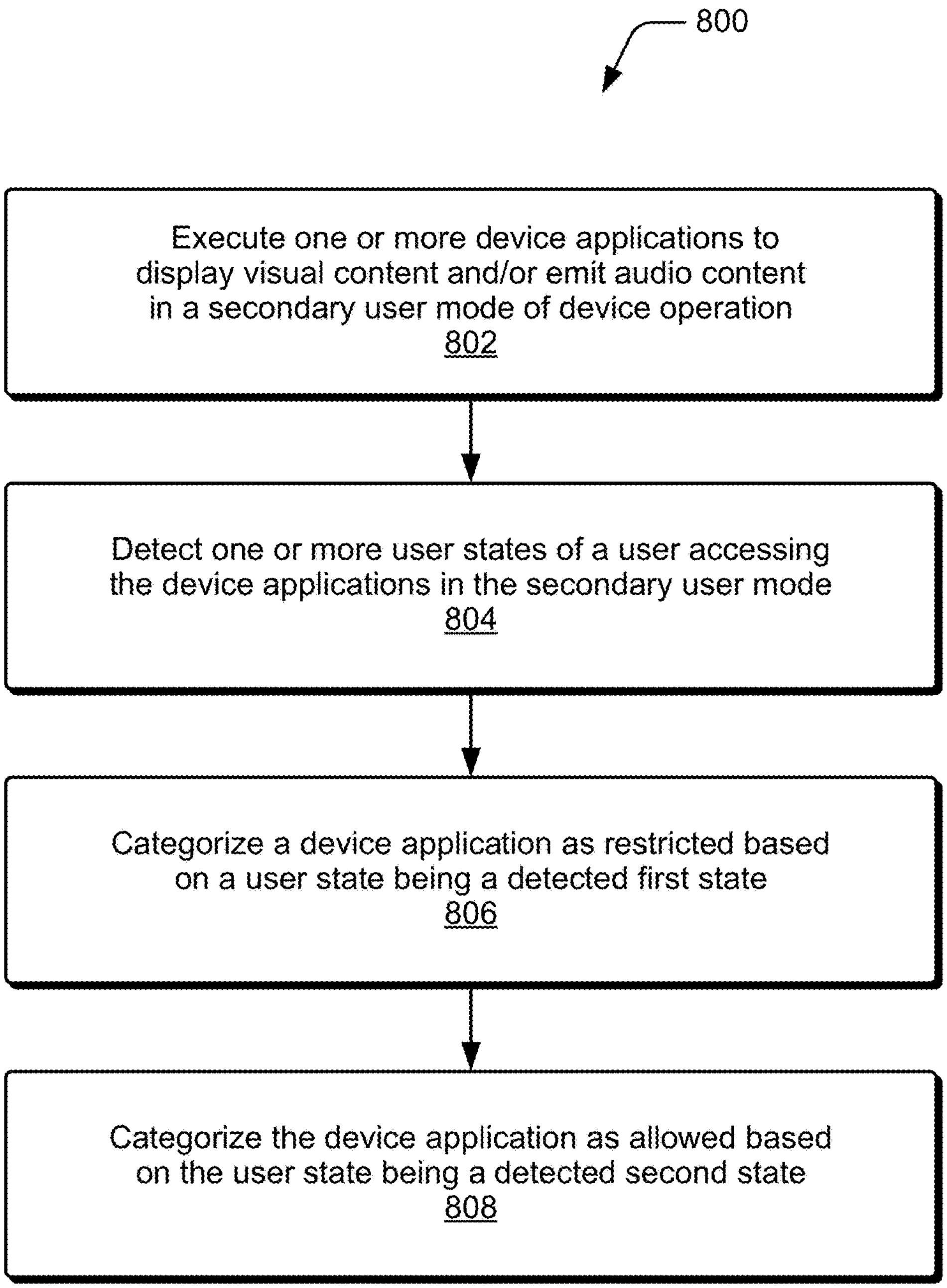

FIG. 8

Execute one or more device applications to display visual content and/or emit audio content in a secondary user mode of device operation
902

Detect one or more user states of a user accessing the device applications in the secondary user mode
904

Categorize one or more detected user states as one of constructive or destructive
906

Generate a ranked list of the device applications based on the one or more user states and associated categorization of the respective device applications
908

Generate a highlight reel of the captured screen shots of the visual content associated with the respective device applications
910

Assess similar visual content or similar audio content based on categorization of the applications
912

Restrict or allow the similar visual content or the similar audio content based on the assessment
914

Develop an acceptable content list specific to the user, the acceptable content list including allowable visual content and/or allowable audio content
916

Generate an emotional ranking associated with the device applications based on the one or more user states of the user accessing the respective device applications
918

Merge the emotional ranking that is associated with the one or more of the device applications with a different emotional ranking received from another device
920

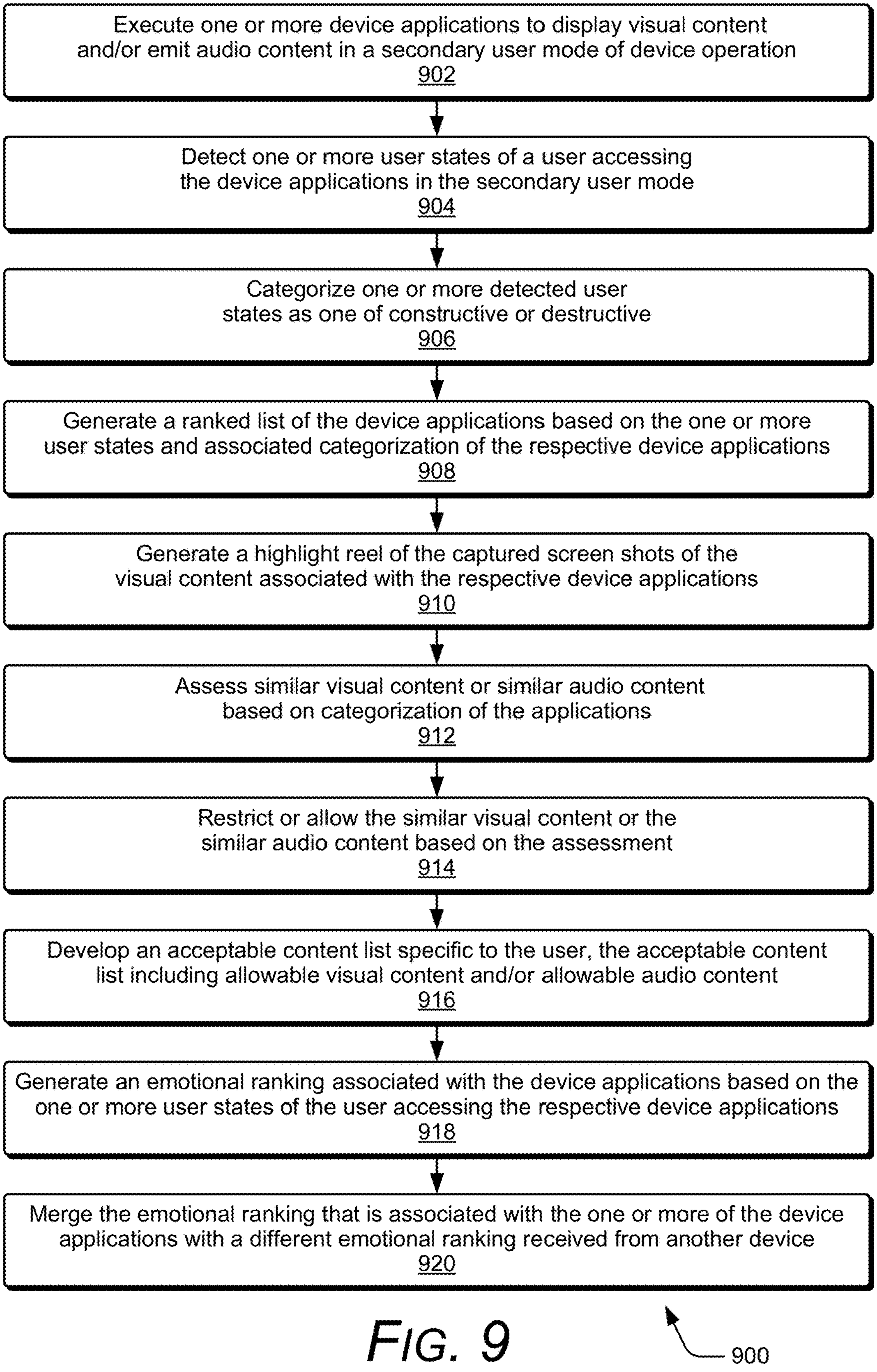

FIG. 9

DEVICE CONFIGURATION BASED ON DETECTED USER STATE

BACKGROUND

Devices such as smart devices, mobile devices (e.g., cellular phones, tablet devices, smartphones), consumer electronics, and the like can be implemented for use in a wide range of environments and for a variety of different applications. Generally, a primary owner or user of a device, such as a parent with a mobile phone, may want to allow a secondary user, such as a child, to temporarily use the device to occupy the child, and allow the child to engage in activities with device applications on the device. These activities can include, viewing video, listening to audio, playing games, using social media applications, and the like. Some devices provide the primary owner or user of a device with the ability to establish access control in a secondary user mode of device operation, such as to control applications that are permitted to run in the safe mode, and for a specified time duration. This is commonly referred to as the screen time that a parent may allow a child to access and use the device.

BRIEF DESCRIPTION OF THE DRAWINGS

Implementations of the techniques for device access control and/or configuration based on a detected user state are described with reference to the following Figures. The same numbers may be used throughout to reference like features and components shown in the Figures.

FIGS. 3-9 illustrate example methods for device access control and/or configuration based on a detected user state in accordance with one or more implementations of the techniques described herein.

DETAILED DESCRIPTION

Figure 1:
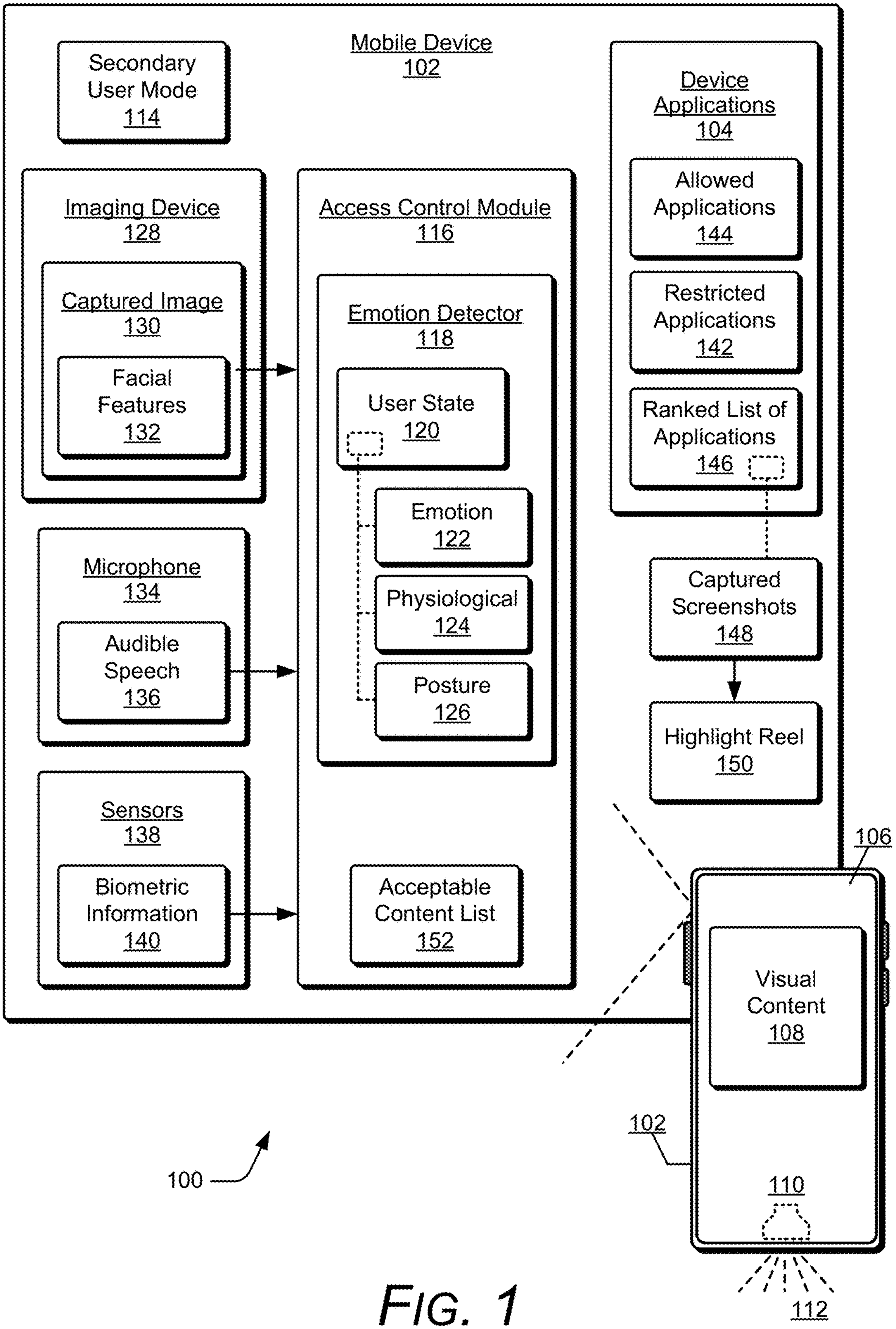
FIG. 1 illustrates an example system for device access control and/or configuration based on a detected user state in accordance with one or more implementations as described herein.

Implementations of the techniques for device access control and/or configuration based on a detected user state may be implemented as described herein. A mobile device, such as any type of a wireless device, media device, mobile phone, flip phone, client device, tablet, computing, communication, entertainment, gaming, media playback, and/or any other type of computing and/or electronic device, or a system of any combination of such devices, may be configured to perform aspects of the described techniques. In one or more implementations, a mobile device includes an access control module, which can be utilized to implement aspects of the techniques described herein.

In some aspects of device operation, a mobile device can be operable in a secondary user mode of device operation. Generally, a primary owner or user of the device, such as a parent with a mobile phone, may want to allow a secondary user, such as a child, to temporarily use the device to occupy the child, and allow the child to engage in activities via the device applications on the device. These activities can include, viewing video, listening to audio, playing games, using social media applications, and the like. In the secondary user mode, the primary owner or user of the device can control experience variables, such as the visual content and/or audio content that is allowed, an access duration of time, specific access and/or restrictions to content, and the like. For example, a secondary user can be allowed to use the mobile device with limited access and for a limited duration of time.

More than simply restricting the screen time (e.g., an allocated time duration) that a secondary user may use a mobile device to view visual content and/or listen to audio content, aspects of the described techniques can be implemented for device access control and/or device configuration based on detected user states. Although a digital well-being application can be used to restrict device access and screen time, it can be difficult to ascertain the type of influence that some content may have on a secondary user, particularly a child or other minor, given that various content is easily accessible, may be dynamically loaded, and can influence a secondary user by various factors, to include location, time, and user preferences.

For example, a parent who allows a child to use the mobile device as a secondary user may want to know what type of content causes emotional and/or physiological responses in the secondary user. An emotional response may be a negative emotion responsive to what may be considered harmful or inappropriate content (e.g., not suitable for children), whereas another emotional response may be a positive emotion responsive to what may be considered appropriate content for a child. In implementations, a negative emotion response may be associated with a detected user state that is labeled as destructive or negative, whereas a positive emotion response may be associated with a detected user state that is labeled constructive or positive. As described herein, a detected user state of a secondary user of a mobile device can be categorized based on any one or more of an age of the user, biometric information of the user, an emotion of the user, a physiological state of the user, and/or a body posture of the user.

Aspects of the described techniques provide for managing device access control and/or configuration based on detected emotions of a secondary user who is using the mobile device. As a positive user experience, for example, a parent who is the primary owner or user of the mobile device would presumptively feel safe or secure to share the device with a child (e.g., a secondary user) without worry about a bad influence on the child due to inappropriate content (e.g., not suitable or recommended for a child) that may be accessible on the mobile device.

An access control module can be implemented in a mobile device to monitor visual content and/or audio content that is being rendered for playback on the device, such as visual content that is displayed for viewing and audio content that is emitted for listening. In implementations, the access control module includes an emotion detector that is implemented to detect a user state of a user (e.g., a secondary user) who is accessing the device. In one or more devices, the emotion detector of the access control module can be implemented using a machine learning model or algorithm (e.g., a neural network, AI algorithms) that can detect a user state of the user who is accessing the device.

Notably, the emotion detector can detect and/or determine a user state, to include an emotion, a physiological state, and/or posture based on any one or combination of an expression and facial features of the user, audible speech from the user, and/or from sensors obtaining biometric information associated with the user of the device. In one or more implementations, the overall user state and/or the aspects of the user state (e.g., the emotions, physiological states, and posture) can be determined by the emotion detector based on comparison with previously obtained baseline data that provides a comparison basis to detect the changes in user state.

While features and concepts of the described techniques for device access control and/or configuration based on a detected user state is implemented in any number of different devices, systems, environments, and/or configurations, implementations of the techniques for device access control and/or configuration based on a detected user state are described in the context of the following example devices, systems, and methods.

FIG. 1 illustrates an example system 100 for device access control and/or configuration based on a detected user state, as described herein. The system 100 includes a mobile device 102, which can include or be implemented as any type of a wireless device, mobile device, mobile phone, flip phone, client device, companion device, tablet, computing device, communication device, entertainment device, gaming device, media playback device, any other type of computing and/or electronic device.

The mobile device 102 can implemented with various components, such as a processor system and memory, as well as any number and combination of different components as further described with reference to the example device shown in FIG. 10. In implementations, the mobile device 102 includes various radios for wireless communication with other devices. For example, the mobile device 102 can include a BLUETOOTH® and/or BLE transceiver, a near field communication (NFC) transceiver, and the like. In some cases, the mobile device 102 includes at least one of a WI-FI® radio, a cellular radio, a global positioning satellite (GPS) radio, or any available type of device communication interface.

The mobile device 102 can also include and implement various device applications 104, such as any type of messaging application, email application, video communication application, cellular communication application, music/audio application, gaming application, media application, social media platform applications, and/or any other of the many possible types of various device applications. Many of the device applications 104 have an associated application user interface that is generated and displayed for user interaction and viewing, such as on a display device 106 of the mobile device 102. Generally, an application user interface, or any other type of video, image, graphic, animated GIF, and the like is digital visual content 108 that is displayable on the display device 106 of the mobile device 102. For example, a movie, video, or other similar visual content 108 can be displayed for viewing on the display device 106 of the mobile device. Notably, if the display device 106 of the mobile device 102 is turned-on, then some type of the visual content 108 is displayed for viewing. In this example, the mobile device 102 also includes a speaker 110 that emits audio content 112, such as the audio content that is associated with a movie or video, or music audio from a music application.

In some aspects of device operation, the mobile device 102 can be operable in a secondary user mode 114 of device operation. Generally, a primary owner or user of the device, such as a parent with a mobile phone, may want to allow a secondary user, such as a child, to temporarily use the device to occupy the child, and allow the child to engage in activities via the device applications 104 on the device. These activities can include viewing video, listening to audio, playing games, using social media applications, and the like. In the secondary user mode 114, the primary owner or user of the device can control experience variables, such as the visual content and/or audio content that is allowed, an access duration of time, specific access and/or restrictions to content, and the like. For example, a secondary user can be allowed to use the mobile device 102 with limited access and for a limited duration of time.

More than simply restricting the screen time (e.g., an allocated time duration) that a secondary user may use the mobile device 102 to view the visual content 108 and/or listen to audio content, aspects of the described techniques can be implemented for device access control and/or device configuration based on detected user states. Although a digital well-being application can be used to restrict device access and screen time, it can be difficult to ascertain the type of influence that some content may have on a secondary user, particularly a child or other minor, given that various content is easily accessible, may be dynamically loaded, and can influence a secondary user by various factors, to include location, time, and user preferences.

For example, a parent who allows a child to use the mobile device 102 as a secondary user may want to know what type of content causes emotional and/or physiological responses in the secondary user. An emotional response may be a negative emotion responsive to what may be considered harmful or inappropriate content (e.g., not suitable for children), whereas another emotional response may be a positive emotion responsive to what may be considered appropriate content for a child. In implementations, a negative emotion response may be associated with a detected user state that is labeled destructive or negative, whereas a positive emotion response may be associated with a detected user state that is labeled constructive or positive. As described herein, a detected user state of a secondary user of the mobile device 102 can be categorized based on any one or more of an age of the user, biometric information of the user, an emotion of the user, a physiological state of the user, and/or a body posture of the user.

In the example system 100 for device access control and/or configuration based on a detected user state, the mobile device 102 implements an access control module 116 (e.g., as a device application). As shown in this example, the access control module 116 represents functionality (e.g., logic, software, and/or hardware) enabling aspects of the described techniques for device access control and/or configuration based on a detected user state. The access control module 116 can be implemented as computer instructions stored on computer-readable storage media and can be executed by a processor system of the mobile device 102. Alternatively, or in addition, the access control module 116 can be implemented at least partially in hardware of the device.

In one or more implementations, the access control module 116 includes independent processing, memory, and/or logic components functioning as a computing and/or electronic device integrated with the mobile device 102. Alternatively, or in addition, the access control module 116 can be implemented in software, in hardware, or as a combination of software and hardware components. In this example, the access control module 116 is implemented as a software application or module, such as executable software instructions (e.g., computer-executable instructions) that are executable with a processor system of the mobile device 102 to implement the techniques and features described herein. As a software application or module, the access control module 116 can be stored on computer-readable storage memory (e.g., memory of a device), or in any other suitable memory device or electronic data storage implemented with the controller. Alternatively or in addition, the access control module 116 is implemented in firmware and/or at least partially in computer hardware. For example, at least part of the access control module 116 is executable by a computer processor, and/or at least part of the content manager is implemented in logic circuitry.

In this example system 100, the mobile device 102 includes the device applications 104 that can be accessed to display the visual content 108 and/or emit the audio content 112 in the secondary user mode 114 of device operation. The access control module 116 includes an emotion detector 118 that is implemented to detect a user state 120 of a user (e.g., a secondary user) who is accessing the device. In one or more implementations, the emotion detector 118 of the access control module 116 is implemented using a machine learning model or algorithm (e.g., a neural network, AI algorithms) that can detect the user state 120 of the user who is accessing the device. The access control module 116 and/or the emotion detector 118 implemented as a machine learning model may include artificial intelligence (AI), a machine learning (ML) model or algorithm, a convolutional neural network (CNN), and/or any other type of machine learning model to detect a user state of a user, such as an emotion 122 of the user, a physiological state 124 of the user, and/or a body posture 126 of the user. As used herein, the term "machine learning model" refers to a computer representation that is trainable based on inputs to approximate unknown functions. For example, a machine learning model can utilize algorithms to learn from, and make predictions on, inputs of known data (e.g., training and/or reference images) by analyzing the known data to learn to generate outputs, such as to detect the user state 120, as described herein.

In this example, the mobile device 102 includes an imaging device 128 (e.g., a camera device) utilized to capture images of the user (e.g., a secondary user) who is accessing and using the device. A captured image 130 can include one or more facial features 132 of the user, and the captured image 130 is input to the access control module 116, from which the emotion detector 118 detects the user state 120 of the user based on a facial expression of the user formed by the one or more facial features 132 detected in the captured image. In implementations, the emotion detector 118 implemented as a machine learning model and/or neural network algorithm can recognize emotions based on changes in facial features of the user, such as changes in the eyes, nose, mouth, and eyebrows. The emotion detector 118 can identify facial expressions and recognize the corresponding emotion of the user.

Further, the mobile device 102 includes a microphone 134 to detect audible speech 136 of the user (e.g., a secondary user) who is accessing and using the device. The audible speech 136 can be input to the access control module 116, from which the emotion detector 118 detects the user state 120 of the user based on what the user indicates in the audible speech. In this example, the mobile device 102 also includes one or more sensors 138, such as sensors to detect biometric information 140 about the user of the device. The biometric information 140 about the user, such as heart rate, skin conductance, and any other type of biometric information can be input to the access control module 116, from which the emotion detector 118 detects the user state 120 of the user based on analyzing the biometric data.

Notably, the emotion detector 118 can detect and/or determine the user state 120, to include an emotion 122, a physiological state 124, and/or posture 126 based on any one or combination of an expression and the facial features 132 of the user, the audible speech 136 from the user, and/or from the sensors 138 obtaining the biometric information 140 associated with the user of the device. In one or more implementations, the overall user state 120 and/or the aspects of the user state (e.g., the emotions 122, physiological states 124, and posture 126) can be determined by the emotion detector 118 based on comparison with previously obtained baseline data that provides a comparison basis to detect the changes in user state. However, it should be noted that a machine learning model or algorithm-based emotion detector may be implemented to detect and/or determine a user state without baseline comparison data.

In one or more implementations, the access control module 116 categorizes a device application 104 as a restricted application 142 based on the user state 120 being a detected first state. Alternatively, the access control module 116 categorizes a device application 104 as an allowed application 144 based on the user state 120 being a detected second state. Similarly, the access control module 116 can restrict the audio content 112 that is being emitted from the speaker 110 of the device based on the user state 120 being the detected first state, or alternatively, allow the audio content 112 that is being emitted based on the user state being the detected second state. For example, the access control module 116 can detect the user state 120 of the user as associated with an emotion of the user, where the detected first state of the user is a negative emotion, or the detected second state of the user is a positive emotion. In implementations, the access control module 116 can categorize a detected user state 120 as one of constructive (e.g., positive) or destructive (e.g., negative). The access control module 116 can then allow use of a device application 104 associated with the detected user state being constructive or positive, and/or restrict use of a device application 104 associated with the detected user state being destructive or negative.

The access control module 116 can also be implemented to detect a change in the user state 120 of the user during the display of the visual content 108, such as a change in the user state from the detected second state to the detected first state, in which case the access control module 116 initiates to replace the display of the visual content 108 with different visual content that is associated with the detected second state (e.g., associated with a positive emotion). Similarly, the access control module 116 can detect a change in the user state 120 of the user during the display of the visual content 108, such as a change in the user state from a positive emotion to a negative emotion, and then restrict the display of the visual content 108 based on the change in the user state.

In additional one or more implementations of device access control and/or configuration based on a detected user state, the access control module 116 can categorize one or more detected user states 120 as constructive or destructive. The access control module 116 can then generate an emotional ranking associated with one or more of the device applications 104 based on the user states of the user accessing the respective device applications. For example, the access control module can generate a ranked list 146 of the device applications 104 based on the user state 120 (or multiple user states) and associated categorization of the respective device applications.

In implementations, the access control module 116 can generate the ranked list 146 of the device applications 104 to include captured screenshots 148 of the visual content 108 that is associated with the respective device applications. The access control module 116 can then also generate a highlight reel 150 of the captured screenshots 148 of the visual content associated with the respective device applications. The highlight reel 150 can include the screenshots captured by the imaging device 128, or another type of content capture feature implemented with the mobile device 102. Audio content may also be included with the generated highlight reel 150, such as audio content that is associated with the visual content 108 displayed for viewing on the display device 106 of the mobile device, as well as the audible speech 136 that is captured with the microphone 134 of the device.

In an aspect of the described features, the emotion detector 118 can detect an emotion 122 as part of a user state 120, and if the emotion is determined to exceed a threshold considered for a destructive or negative emotion, a captured screenshot 148 can be added to the highlight reel 150 for user analysis of the particular visual content 108 that correlates with the user destructive or negative emotion. For the concept of device access control based on a detected user state, the access control module 116 can detect an emotion 122 that contributes to a particular user state 120, and for a determination of a destructive emotion, and initiate to turn off or revoke secondary user access to the visual content 108 and/or to the audio content 112 that correlates with the destructive or negative emotion of the secondary user. Similarly, for the concept of device configuration based on a detected user state, the access control module 116 can detect an emotion 122 that contributes to a particular user state 120, and for a determination of a destructive emotion, initiate to capture the screenshots 148 of the visual content that contributes to the destructive or negative emotion of the secondary user for analysis by the primary owner or user of the device. The access control module 116 can differentiate between constructive emotions and destructive emotions, as well as promote content that elicits constructive emotions, and filter or block content causing destructive emotions.

In implementations, the access control module 116 can assess similar visual content or similar audio content based on the categorization of the device applications 104, and restrict or allow the similar visual content or the similar audio content based on the assessment. For example, the access control module 116 can generate an acceptable content list 152, such as for acceptable device applications and/or the type of visual content associated with the respective device applications that correlate with a determination of a constructive or positive emotion of the secondary user of the device. The access control module can then recommend allowed visual content that is assessed similar to the visual content 108 and/or the audio content 112 associated with one or more of the device applications categorized as allowed.

Additionally, the access control module 116 can develop the acceptable content list 152 specific to the secondary user (or any user of the device), where the acceptable content list includes allowable visual content and/or allowable audio content. The access control module 116 maintains the reference record of content categorization causing constructive (positive) emotions or destructive (negative) emotions of a user of the device. Similarly, the access control module 116 can generate an emotional ranking associated with one or more of the device applications 104 based on the user state 120 of the user accessing the respective device applications. In implementations, the access control module 116 can also merge the emotional ranking that is associated with the device applications 104 with a different emotional ranking received from another device.

Figure 2:
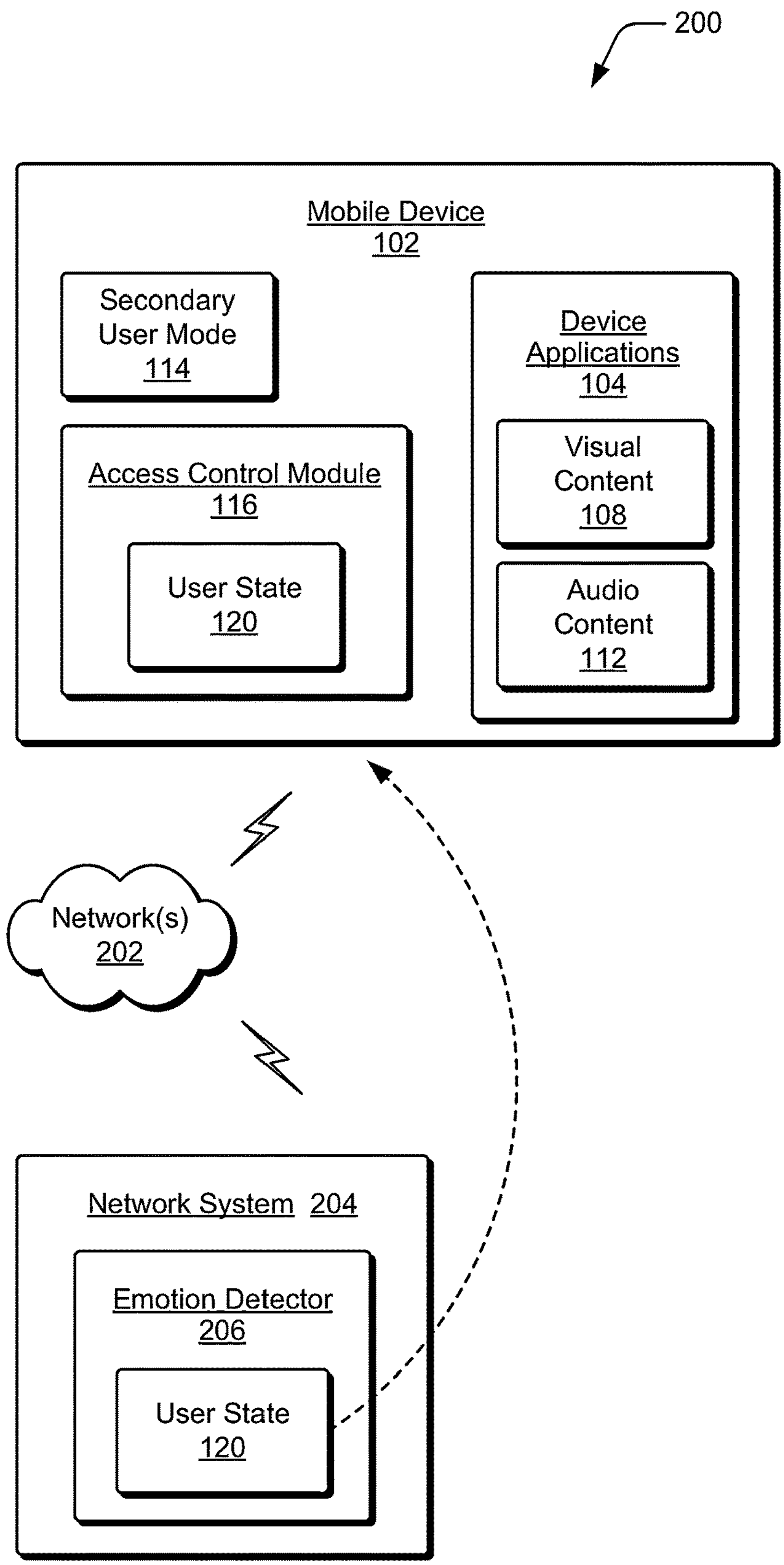
FIG. 2 illustrates another example of device access control and/or configuration based on a detected user state in accordance with one or more implementations as described herein.

FIG. 2 illustrates another example 200 of device access control and/or configuration based on a detected user state, as described herein. In this example 200, the mobile device 102 can include an interface module represents functionality (e.g., logic and/or hardware) enabling the mobile device 102 to interconnect and interface with other devices and/or networks, such as the communication network 202. For example, an interface module enables wireless and/or wired connectivity of the mobile device 102 to a network system 204 via the communication network 202.

In implementations, the devices, applications, modules, servers, and/or services described herein communicate via the communication network 202, such as for data communication with the mobile device 102. The communication network 202 includes a wired and/or a wireless network. The communication network 202 is implemented using any type of network topology and/or communication protocol, and is represented or otherwise implemented as a combination of two or more networks, to include IP-based networks, cellular networks, and/or the Internet. The communication network 202 includes mobile operator networks that are managed by a mobile network operator and/or other network operators, such as a communication service provider, mobile phone provider, and/or Internet service provider.

In this example 200, the access control module 116 of the mobile device 102 can communicate the information from which to determine a user state 120 to a network system 204 (e.g., a cloud-based system) that implements an instantiation of the emotion detector 206, which is an example of the emotion detector 118 described herein. For example, the access control module 116 communicates, to the network system 204, the various captured and/or detected information associated with the secondary user of the mobile device, such as the captured image 130 that may include one or more facial features 132 of the user, the audible speech 136 of the user who is accessing and using the mobile device, and/or the biometric information 140 about the user of the device.

The emotion detector 206 implemented at the network system 204 can detect and/or determine the user state 120, to include an emotion 122, a physiological state 124, and/or posture 126 based on any one or combination of an expression and the facial features 132 of the user, the audible speech 136 from the user, and/or from the sensors 138 obtaining the biometric information 140 associated with the user of the device. The network system 204 can then communicate the detected or determined user state 120 back to the mobile device 102 via the communication network 202.

Example methods 300, 400, 500, 600, 700, 800, and 900 are described with reference to respective FIGS. 3-9 in accordance with one or more implementations of device access control and/or configuration based on a detected user state, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
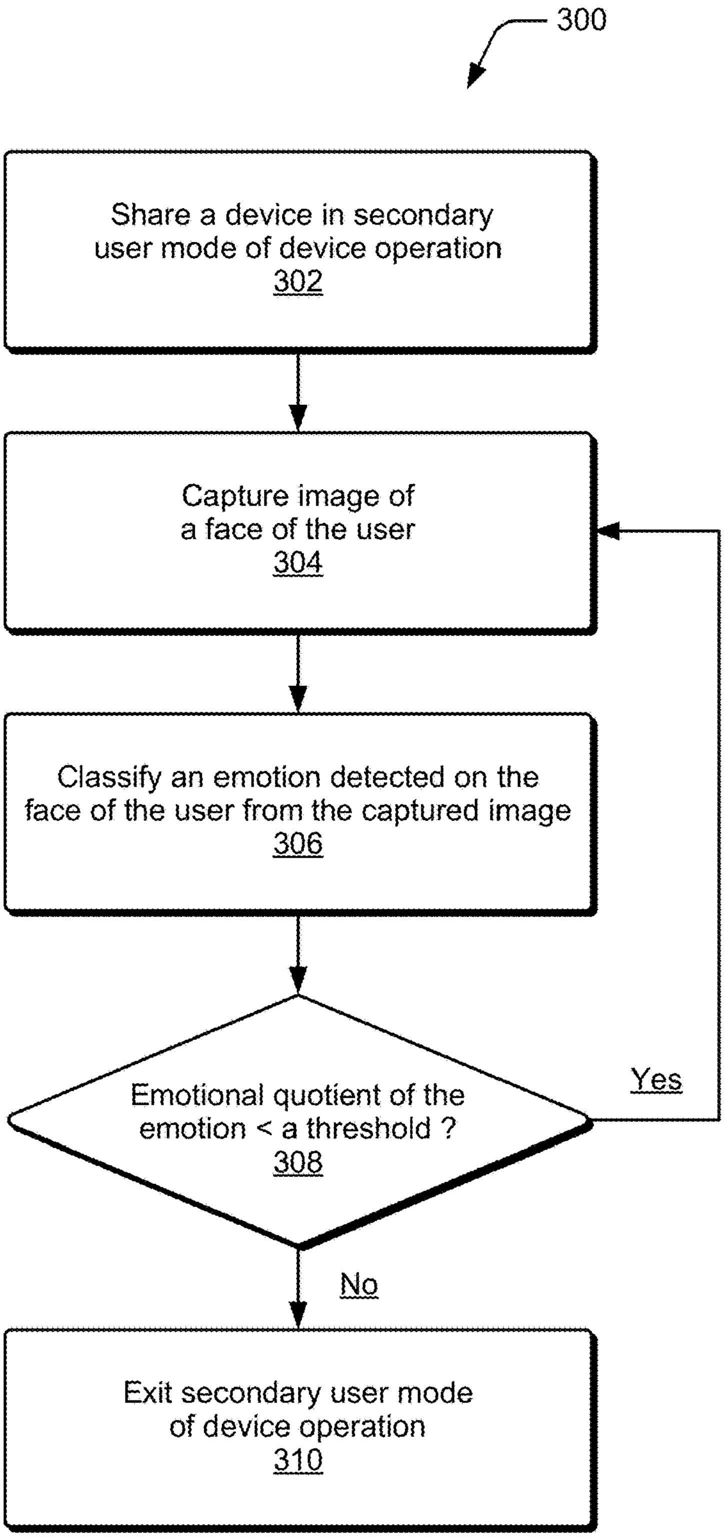

FIG. 3 illustrates example method(s) 300 for device access control and/or configuration based on a detected user state. The order in which the method is described is not intended to be construed as a limitation, and any number or combination of the described method operations may be performed in any order to perform a method, or an alternate method.

At 302, a device is shared in a secondary user mode of device operation. For example, the mobile device 102 is operable in the secondary user mode 114 of device operation, such as when a primary owner or user of the device wants to allow a secondary user to temporarily use the device to engage in activities via the device applications 104 on the device. In the secondary user mode 114, the primary owner or user of the device can control experience variables, such as the visual content and/or audio content that is allowed, an access duration of time, specific access and/or restrictions to content, and the like.

At 304, an image of the face of the user of the device is captured. For example, the imaging device 128 (e.g., a camera device) of the mobile device 102 captures images of the user (e.g., a secondary user) who is accessing and using the device. A captured image 130 can include one or more facial features 132 of the user, and the captured image 130 is input to the access control module 116. At 306, an emotion is classified as detected on the face of the user from the captured image. For example, the emotion detector 118 of the access control module 116 detects the user state 120 of the user based on a facial expression of the user formed by the one or more facial features 132 detected in the captured image.

At 308, a determination is made as to whether an emotional quotient of the emotion is less than a threshold. For example, the access control module 116 determines whether the emotion is determined to exceed a threshold considered for a destructive or negative emotion. If the emotional quotient of the emotion is less than the threshold (i.e., "Yes" from 308), then the process continues at 304 to capture another image of the face of the user. If the emotional quotient of the emotion is more than the threshold (i.e., "No" from 308), then at 310, the device exits the secondary user mode of device operation. For example, the access control module 116 can detect an emotion 122 that contributes to a particular user state 120, and for a determination of a destructive emotion, and initiate to turn off or revoke secondary user access to the visual content 108 and/or to the audio content 112 that correlates with the destructive or negative emotion of the secondary user. The access control module 116 can differentiate between constructive emotions and destructive emotions, as well as promote content that elicits constructive emotions, and filter or block content causing destructive emotions.

Figure 4:
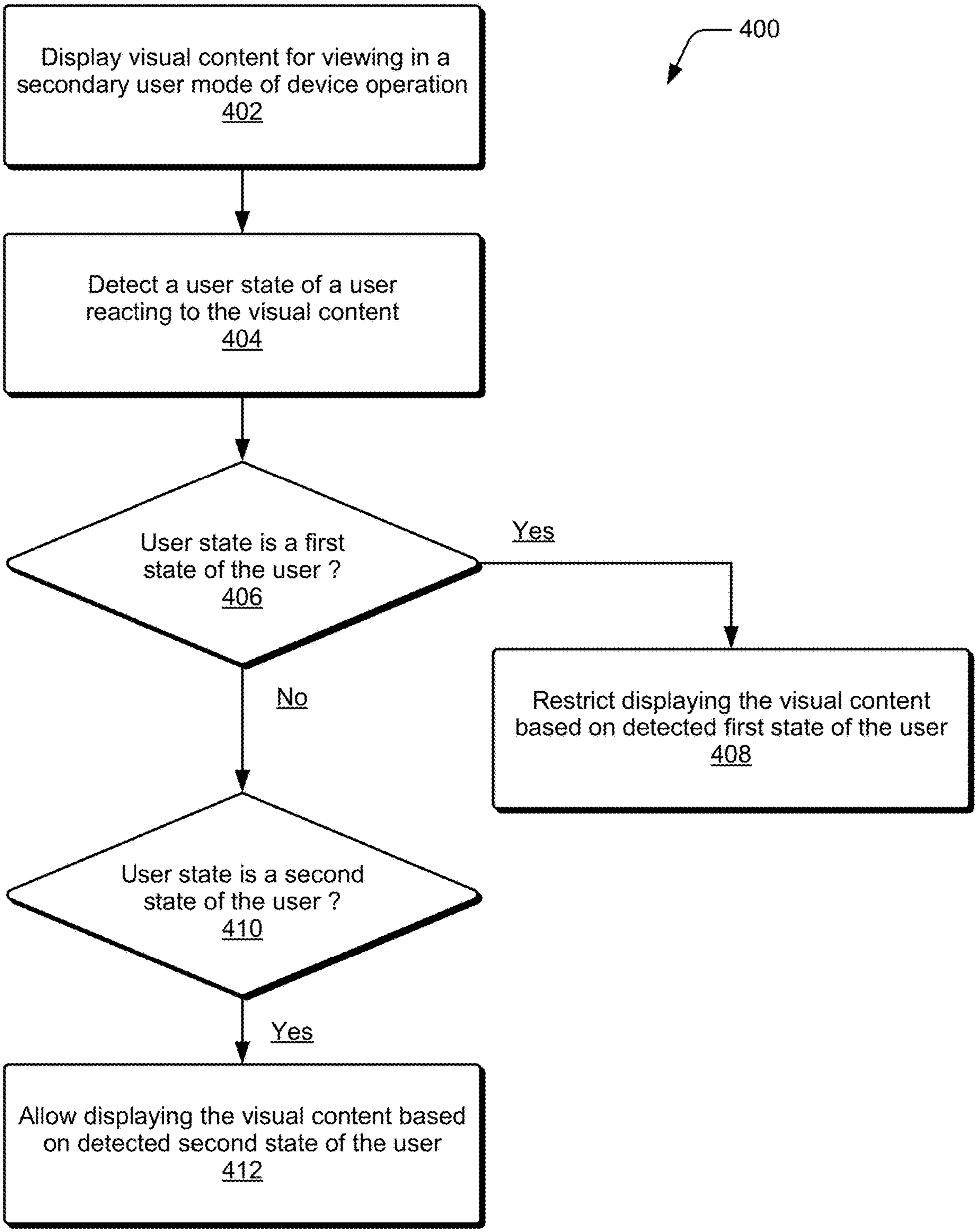

FIG. 4 illustrates example method(s) 400 for device access control based on a detected user state. The order in which the method is described is not intended to be construed as a limitation, and any number or combination of the described method operations may be performed in any order to perform a method, or an alternate method.

At 402, visual content is displayed for viewing in a secondary user mode of device operation. For example, the mobile device 102 is operable in the secondary user mode 114 of device operation, such as when a primary owner or user of the device wants to allow a secondary user to temporarily use the device to engage in activities via the device applications 104 on the device. These activities can include viewing video such as the visual content 108, listening to audio, playing games, using social media applications, and the like.

At 404, a user state of a user reacting to the visual content is detected. For example, the emotion detector 118 of the access control module 116 detects one or more user states 120 of the user reacting to the visual content 108 based on an emotion of the user, a physiological state of the user, and/or a body posture of the user. The user states 120 of the user are detected based on a facial expression of the user formed by one or more facial features 132 detected in a captured image 130, based on detected audible speech 136 from the user, and/or detected based on the biometric information 140 about the user.

At 406, a determination is made as to whether the detected user state is a first state of the user. For example, the access control module 116 detects the user state 120 of the user as associated with an emotion of the user, where the detected first state of the user is a negative emotion. In implementations, user states of the user are detected as associated with an emotion of the user, and the detected first state of the user is a negative emotion. If the detected user state is the first state of the user (i.e., "Yes" from 406), then at 408, the displaying of the visual content is restricted based on the detected first state of the user. For example, the access control module 116 restricts use of a device application 104 associated with the detected user state being destructive or negative, and restricts display of the visual content 108.

If the detected user state is not the first state of the user (i.e., "No" from 406), then at 410, a determination is made as to whether the detected user state is a second state of the user. For example, the access control module 116 detects the user state 120 of the user as associated with an emotion of the user, where the detected second state of the user is a positive emotion. If the detected user state is the second state of the user (i.e., "Yes" from 410), then at 412, the displaying of the visual content is allowed based on the detected second state of the user. For example, the access control module 116 allows use of a device application 104 associated with the detected user state being constructive or positive, and allows display of the visual content 108.

Figure 5:
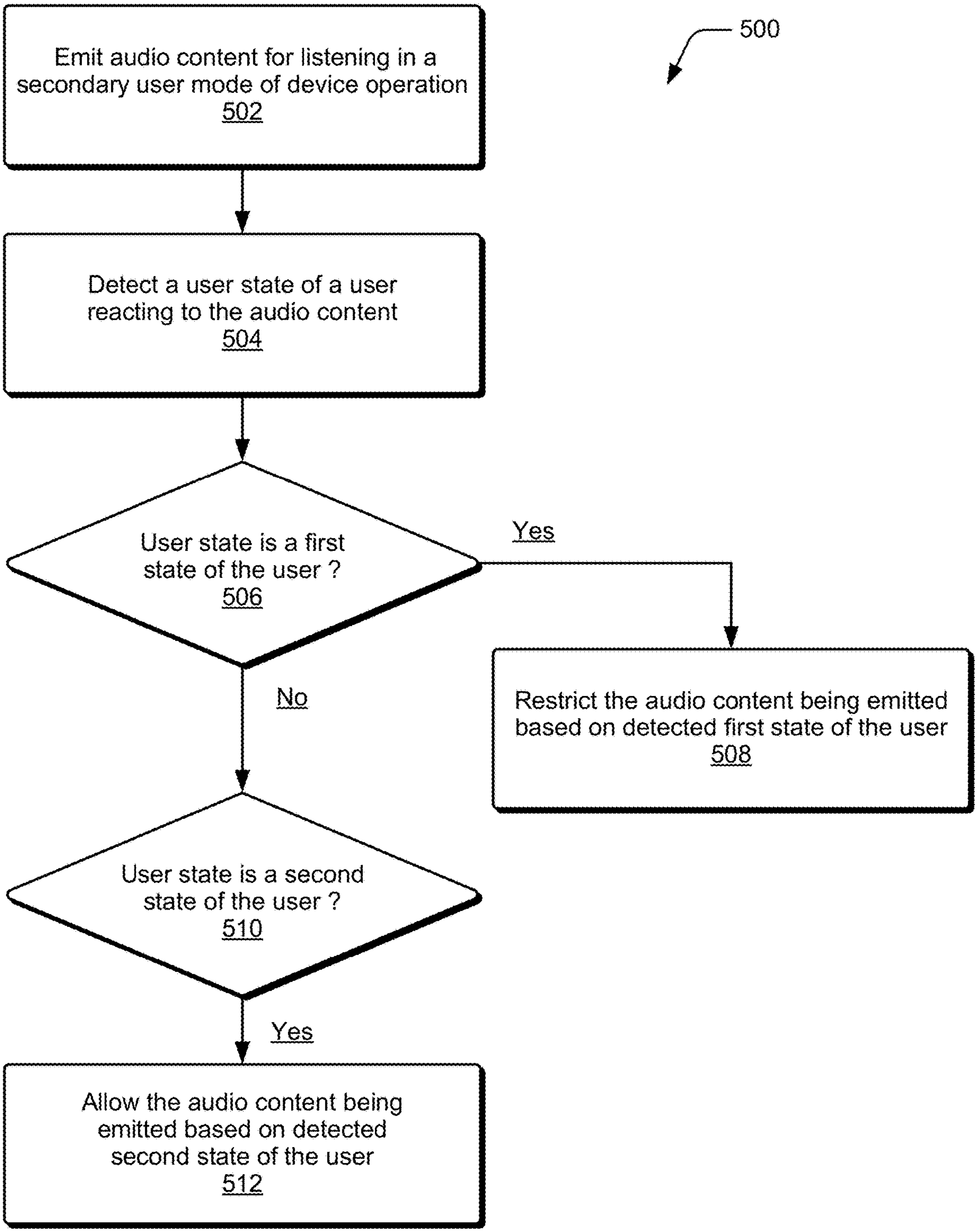

FIG. 5 illustrates example method(s) 500 for device access control based on a detected user state. The order in which the method is described is not intended to be construed as a limitation, and any number or combination of the described method operations may be performed in any order to perform a method, or an alternate method.

At 502, audio content is emitted for listening in a secondary user mode of device operation. For example, the mobile device 102 is operable in the secondary user mode 114 of device operation, such as when a primary owner or user of the device wants to allow a secondary user to temporarily use the device to engage in activities via the device applications 104 on the device. These activities can include viewing video, listening to audio such as the audio content 112, playing games, using social media applications, and the like.

At 504, a user state of a user reacting to the audio content is detected. For example, the emotion detector 118 of the access control module 116 detects one or more user states 120 of the user reacting to the audio content 112 based on an emotion of the user, a physiological state of the user, and/or a body posture of the user. The user states 120 of the user are detected based on a facial expression of the user formed by one or more facial features 132 detected in a captured image 130, based on detected audible speech 136 from the user, and/or detected based on the biometric information 140 about the user.

At 506, a determination is made as to whether the detected user state is a first state of the user. For example, the access control module 116 detects the user state 120 of the user as associated with an emotion of the user, where the detected first state of the user is a negative emotion. In implementations, user states of the user are detected as associated with an emotion of the user, and the detected first state of the user is a negative emotion. If the detected user state is the first state of the user (i.e., "Yes" from 506), then at 508, the audio content is restricted based on the detected first state of the user. For example, the access control module 116 restricts use of a device application 104 associated with the detected user state being destructive or negative, and restricts the emitted audio content 112.

If the detected user state is not the first state of the user (i.e., "No" from 506), then at 510, a determination is made as to whether the detected user state is a second state of the user. For example, the access control module 116 detects the user state 120 of the user as associated with an emotion of the user, where the detected second state of the user is a positive emotion. If the detected user state is the second state of the user (i.e., "Yes" from 510), then at 512, the audio content is allowed based on the detected second state of the user. For example, the access control module 116 allows use of a device application 104 associated with the detected user state being constructive or positive, and allows the emitted audio content 112.

FIG. 6 illustrates example method(s) 600 for device access control based on a detected user state. The order in which the method is described is not intended to be construed as a limitation, and any number or combination of the described method operations may be performed in any order to perform a method, or an alternate method.

At 602, visual content is displayed for viewing in a secondary user mode of device operation. For example, the mobile device 102 is operable in the secondary user mode 114 of device operation, such as when a primary owner or user of the device wants to allow a secondary user to temporarily use the device to engage in activities via the device applications 104 on the device. These activities can include viewing video such as the visual content 108, listening to audio, playing games, using social media applications, and the like.

At 604, a user state of a user reacting to the visual content is detected. For example, the emotion detector 118 of the access control module 116 detects one or more user states 120 of the user reacting to the visual content 108 based on an emotion of the user, a physiological state of the user, and/or a body posture of the user. The user states 120 of the user are detected based on a facial expression of the user formed by one or more facial features 132 detected in a captured image 130, based on detected audible speech 136 from the user, and/or detected based on the biometric information 140 about the user.

At 606, a change in the user state of the user is detected during displaying the visual content. For example, the emotion detector 118 implemented as a machine learning model and/or neural network algorithm can recognize emotions based on changes in facial features of the user, such as changes in the eyes, nose, mouth, and eyebrows. The emotion detector 118 can identify facial expressions and recognize the corresponding emotion of the user, and a change in the user state 120 from the positive emotion to the negative emotion.

At 608, the display of the visual content is replaced with different visual content. For example, the access control module 116 detects a change in the user state 120 of the user during the display of the visual content 108, such as a change in the user state from the positive emotion to the negative emotion, in which case the access control module 116 initiates to replace the display of the visual content 108 with different visual content that is associated with the positive emotion.

At 610, the displaying of the visual content is restricted based on the change in the user state. For example, the access control module 116 detects a change in the user state 120 of the user during the display of the visual content 108, such as a change in the user state from a positive emotion to a negative emotion, and then restricts the display of the visual content 108 based on the change in the user state to the negative emotion.

FIG. 7 illustrates example method(s) 700 for device access control based on a detected user state. The order in which the method is described is not intended to be construed as a limitation, and any number or combination of the described method operations may be performed in any order to perform a method, or an alternate method.

At 702, use of one or more device applications that display visual content and/or emit audio content is allowed. For example, the mobile device 102 is operable in the secondary user mode 114 of device operation, such as when a primary owner or user of the device wants to allow a secondary user to temporarily use the device to engage in activities via the device applications 104 on the device. These activities can include viewing video such as the visual content 108, listening to audio, playing games, using social media applications, and the like.

At 704, a detected user state is categorized as one of constructive or destructive. For example, the access control module 116 categorizes a detected user state 120 as one of constructive or destructive based on an age of the user (e.g., secondary user), biometric information of the user, an emotion of the user, a physiological state of the user, and/or or a body posture of the user.

At 706, use of a first device application associated with the detected user state being constructive is allowed. For example, the access control module 116 allows use of a first device application 104 that is associated with the detected user state 120 being constructive or positive. At 708, use of a second device application associated with the detected user state being destructive is restricted. For example, the access control module 116 restricts use of a second device application 104 that is associated with the detected user state 120 being destructive or negative.

FIG. 8 illustrates example method(s) 800 for device configuration based on a detected user state. The order in which the method is described is not intended to be construed as a limitation, and any number or combination of the described method operations may be performed in any order to perform a method, or an alternate method.

At 802, one or more device applications are executed to display visual content and/or emit audio content in a secondary user mode of device operation. For example, the mobile device 102 is operable in the secondary user mode 114 of device operation, such as when a primary owner or user of the device wants to allow a secondary user to temporarily use the device to engage in activities via the device applications 104 on the device. These activities can include viewing video such as the visual content 108, listening to audio, playing games, using social media applications, and the like.

At 804, one or more user states of a user accessing the device applications in the secondary user mode are detected. For example, the emotion detector 118 of the access control module 116 detects one or more user states 120 of the user accessing the device applications 104 in the secondary user mode based on an emotion of the user, a physiological state of the user, and/or a body posture of the user. The user states 120 of the user are detected based on a facial expression of the user formed by one or more facial features 132 detected in a captured image 130, based on detected audible speech 136 from the user, and/or detected based on the biometric information 140 about the user.

At 806, a device application is categorized as restricted based on a user state being a detected first state. For example, the access control module 116 categorizes a device application 104 as a restricted application 142 based on the user state 120 being a detected first state (e.g., a destructive or negative emotion, as described herein). At 808, the device application is categorized as allowed based on the user state being a detected second state. For example, the access control module 116 categorizes a device application 104 as an allowed application 144 based on the user state 120 being a detected second state (e.g., a constructive or positive emotion, as described herein).

FIG. 9 illustrates example method(s) 900 for device configuration based on a detected user state. The order in which the method is described is not intended to be construed as a limitation, and any number or combination of the described method operations may be performed in any order to perform a method, or an alternate method.

At 902, one or more device applications are executed to display visual content and/or emit audio content in a secondary user mode of device operation. For example, the mobile device 102 is operable in the secondary user mode 114 of device operation, such as when a primary owner or user of the device wants to allow a secondary user to temporarily use the device to engage in activities via the device applications 104 on the device. These activities can include viewing video such as the visual content 108, listening to audio, playing games, using social media applications, and the like.

At 904, one or more user states of a user accessing the device applications in the secondary user mode are detected. For example, the emotion detector 118 of the access control module 116 detects one or more user states 120 of the user accessing the device applications 104 in the secondary user mode based on an emotion of the user, a physiological state of the user, and/or a body posture of the user. The user states 120 of the user are detected based on a facial expression of the user formed by one or more facial features 132 detected in a captured image 130, based on detected audible speech 136 from the user, and/or detected based on the biometric information 140 about the user.

At 906, one or more detected user states are categorized as one of constructive or destructive. For example, the access control module 116 categorizes a detected user state 120 as one of constructive or destructive based on an age of the user (e.g., secondary user), biometric information of the user, an emotion of the user, a physiological state of the user, and/or or a body posture of the user.

At 908, a ranked list of the device applications is generated based on the one or more user states and associated categorization of the respective device applications. For example, the access control module 116 generates the ranked list 146 of the device applications 104 based on the user state 120 (or multiple user states) and associated categorization of the respective device applications. In implementations, the access control module 116 generates the ranked list 146 of the device applications 104 to include the captured screenshots 148 of the visual content 108 that is associated with the respective device applications.

At 910, a highlight reel is generated from the captured screen shots of the visual content associated with the respective device applications. For example, the access control module 116 also generates the highlight reel 150 of the captured screenshots 148 of the visual content associated with the respective device applications. The highlight reel 150 can include the screenshots captured by the imaging device 128, or another type of content capture feature implemented with the mobile device 102. Audio content may also be included with the generated highlight reel 150, such as audio content that is associated with the visual content 108 displayed for viewing on the display device 106 of the mobile device, as well as the audible speech 136 that is captured with the microphone 134 of the device.

At 912, similar visual content or similar audio content is assessed based on categorization of the applications. For example, the access control module 116 assess similar visual content or similar audio content based on the categorization of the device applications 104. At 914, the similar visual content or the similar audio content is restricted or allowed based on the assessment. For example, the access control module 116 restricts or allows the similar visual content or the similar audio content based on the assessment.

At 916, an acceptable content list specific to the user is developed, the acceptable content list including allowable visual content and/or allowable audio content. For example, the access control module 116 generates the acceptable content list 152, such as for acceptable device applications and/or the type of visual content associated with the respective device applications that correlate with a determination of a constructive or positive emotion of the secondary user of the device. The access control module can then recommend allowed visual content that is assessed similar to the visual content 108 and/or the audio content 112 associated with one or more of the device applications categorized as allowed.

At 918, an emotional ranking associated with the device applications is generated based on the one or more user states of the user accessing the respective device applications. For example, the access control module 116 generates an emotional ranking associated with one or more of the device applications 104 based on the user state 120 of the user accessing the respective device applications. At 920, the emotional ranking that is associated with the one or more of the device applications is merged with a different emotional ranking received from another device. For example, the access control module 116 can also merge the emotional ranking that is associated with the device applications 104 with a different emotional ranking received from another device.

Figure 10:
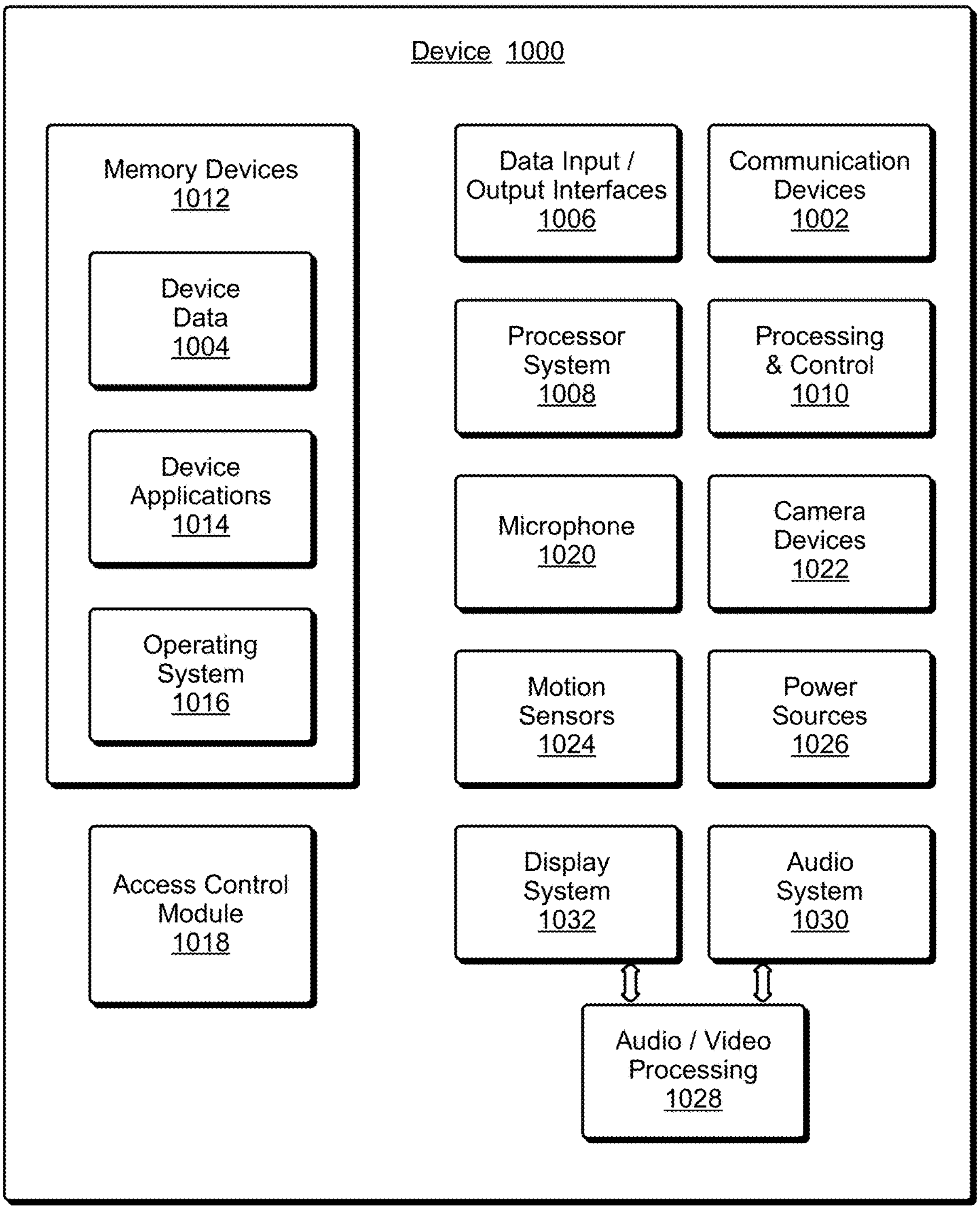
FIG. 10 illustrates various components of an example device that may be used to implement the techniques for device access control and/or configuration based on a detected user state as described herein.

FIG. 10 illustrates various components of an example device 1000, which can implement aspects of the techniques and features for device access control and/or configuration based on a detected user state, as described herein. The example device 1000 may be implemented as any of the devices described with reference to the previous FIGS. 1-9, such as any type of a wireless device, mobile device, mobile phone, flip phone, client device, companion device, display device, tablet, computing, communication, entertainment, gaming, media playback, and/or any other type of computing and/or electronic device. For example, the mobile device 102 described with reference to FIGS. 1-9 may be implemented as the example device 1000.

The example device 1000 can include various, different communication devices 1002 that enable wired and/or wireless communication of device data 1004 with other devices. The device data 1004 can include any of the various devices data and content that is generated, processed, determined, received, stored, and/or communicated from one computing device to another. Generally, the device data 1004 can include any form of audio, video, image, graphics, and/or electronic data that is generated by applications executing on a device. The communication devices 1002 can also include transceivers for cellular phone communication and/or for any type of network data communication.

The example device 1000 can also include various, different types of data input/output (I/O) interfaces 1006, such as data network interfaces that provide connection and/or communication links between the devices, data networks, and other devices. The I/O interfaces 1006 may be used to couple the device to any type of components, peripherals, and/or accessory devices, such as a computer input device that may be integrated with the example device 1000. The I/O interfaces 1006 may also include data input ports via which any type of data, information, media content, communications, messages, and/or inputs may be received, such as user inputs to the device, as well as any type of audio, video, image, graphics, and/or electronic data received from any content and/or data source.

The example device 1000 includes a processor system 1008 of one or more processors (e.g., any of microprocessors, controllers, and the like) and/or a processor and memory system implemented as a system-on-chip (SoC) that processes computer-executable instructions. The processor system 1008 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 1010. The example device 1000 may also include any type of a system bus or other data and command transfer system that couples the various components within the device. A system bus can include any one or combination of different bus structures and architectures, as well as control and data lines.

The example device 1000 also includes memory and/or memory devices 1012 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 1012 include volatile memory and non-volatile memory, fixed and removable media devices, and any suitable memory device or electronic data storage that maintains data for computing device access. The memory devices 1012 can include various implementations of random-access memory (RAM), read-only memory (ROM), flash memory, and other types of storage media in various memory device configurations. The example device 1000 may also include a mass storage media device.

The memory devices 1012 (e.g., as computer-readable storage memory) provide data storage mechanisms, such as to store the device data 1004, other types of information and/or electronic data, and various device applications 1014 (e.g., software applications and/or modules). For example, an operating system 1016 may be maintained as software instructions with a memory device 1012 and executed by the processor system 1008 as a software application. The device applications 1014 may also include a device manager, such as any form of a control application, software application, signal-processing and control module, code that is specific to a particular device, a hardware abstraction layer for a particular device, and so on.

In this example, the device 1000 includes an access control module 1018 that implements various aspects of the described features and techniques described herein. The access control module 1018 may be implemented with hardware components and/or in software as one of the device applications 1014, such as when the example device 1000 is implemented as the mobile device 102 described with reference to FIGS. 1-9. An example of the access control module 1018 is the access control module 116 implemented by the mobile device 102, such as a software application and/or as hardware components in the mobile device. In implementations, the access control module 1018 may include independent processing, memory, and logic components as a computing and/or electronic device integrated with the example device 1000.

The example device 1000 can also include a microphone 1020 (e.g., to capture audio speech of a user) and/or camera devices 1022 (e.g., to capture images of the user), as well as motion sensors 1024, such as may be implemented as components of an inertial measurement unit (IMU). The motion sensors 1024 may be implemented with various sensors, such as a gyroscope, an accelerometer, and/or other types of motion sensors to sense motion of the device. The motion sensors 1024 can generate sensor data vectors having three-dimensional parameters (e.g., rotational vectors in x, y, and z-axis coordinates) indicating location, position, acceleration, rotational speed, and/or orientation of the device. The example device 1000 can also include one or more power sources 1026, such as when the device is implemented as a wireless device and/or mobile device. The power sources may include a charging and/or power system, and may be implemented as a flexible strip battery, a rechargeable battery, a charged super-capacitor, and/or any other type of active or passive power source.

The example device 1000 can also include an audio and/or video processing system 1028 that generates audio data for an audio system 1030 and/or generates display data for a display system 1032. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 1000. Alternatively, the audio system and/or the display system are external, peripheral components to the example device.

Although implementations for device access control and/or configuration based on a detected user state have been described in language specific to features and/or methods, the appended claims are not necessarily limited to the specific features or methods described. Rather, the specific features and methods are disclosed as example implementations for device access control and/or configuration based on a detected user state, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

A mobile device, comprising: one or more device applications configured to at least one of display visual content or emit audio content in a secondary user mode of operation of the mobile device; an access control module implemented at least partially in hardware, the access control module configured to: detect a user state of a user accessing the one or more device applications in the secondary user mode; and at least one of: categorize a device application as restricted based on the user state being a detected first state; or categorize the device application as allowed based on the user state being a detected second state.

Alternatively, or in addition to the above-described mobile device, any one or combination of: the access control module is configured to detect the user state of the user as at least one of an emotion of the user, a physiological state of the user, or a body posture of the user. The access control module is configured to generate a ranked list of the one or more device applications based at least in part on the user state and associated categorization of the respective device applications. The access control module is configured to generate the ranked list of the one or more device applications to include captured screen shots of the visual content associated with the respective device applications. The access control module is configured to generate a highlight reel of the captured screen shots of the visual content associated with the respective device applications. The access control module is configured to assess similar visual content or similar audio content based at least in part on categorization of the one or more device applications, and at least one of restrict or allow the similar visual content or the similar audio content based on assessment. The access control module is configured to recommend allowed visual content that is assessed similar to the visual content or the audio content of the device application categorized as allowed. The access control module is configured to develop an acceptable content list specific to the user, the acceptable content list including at least one of allowable visual content or allowable audio content. The access control module is configured to generate an emotional ranking associated with the one or more device applications based at least in part on the user state of the user accessing the respective device applications. The access control module is configured to merge the emotional ranking that is associated with the one or more device applications with a different emotional ranking received from another device.

A method, comprising: executing one or more device applications configured to at least one of display visual content or emit audio content in a secondary user mode of device operation; detecting one or more user states of a user accessing the one or more device applications in the secondary user mode; and at least one of: categorizing a device application as restricted based on a user state being a detected first state; or categorizing the device application as allowed based on the user state being a detected second state.

Alternatively, or in addition to the above-described method, any one or combination of: the user state of the user is detected as at least one of an emotion of the user, a physiological state of the user, or a body posture of the user. The method further comprising: generating a ranked list of the one or more device applications based at least in part on the one or more user states and associated categorization of the respective device applications. The ranked list of the one or more device applications is generated to include captured screen shots of the visual content associated with the respective device applications. The method further comprising: generating a highlight reel of the captured screen shots of the visual content associated with the respective device applications. The method further comprising: assessing similar visual content or similar audio content based at least in part on categorization of the one or more device applications, and at least one of restricting or allowing the similar visual content or the similar audio content based on assessment. The method further comprising: developing an acceptable content list specific to the user, the acceptable content list including at least one of allowable visual content or allowable audio content. The method further comprising: generating an emotional ranking associated with the one or more device applications based at least in part on the one or more user states of the user accessing the respective device applications.

A system, comprising: one or more device applications configured to at least one of display visual content or emit audio content; an access control module implemented at least partially in hardware, the access control module configured to: categorize one or more detected user states as one of constructive or destructive; generate an emotional ranking associated with the one or more device applications based at least in part on the one or more user states of the user accessing the respective device applications.

Alternatively, or in addition to the above-described system: the access control module is configured to detect each of the one or more detected user states of the user as at least one of an emotion of the user, a physiological state of the user, or a body posture of the user.

The invention claimed is:

1. A mobile device, comprising:

one or more device applications configured to at least one of display visual content or emit audio content in a secondary user mode of operation of the mobile device, the secondary user mode being initiated based on a primary user sharing the mobile device with a secondary user;

an access control module implemented at least partially in hardware, the access control module configured to:

detect a user state of the secondary user accessing the one or more device applications in the secondary user mode; and at least one of:

categorize a device application as restricted based on the user state indicating a destructive emotional response of the secondary user to the visual content being displayed or the audio content being emitted; or categorize the device application as allowed based on the user state indicating a constructive emotional response of the secondary user to the visual content being displayed or the audio content being emitted.

2. The mobile device of claim 1, wherein the access control module is configured to detect the user state of the secondary user as at least one of an emotion of the secondary user, a physiological state of the secondary user, or a body posture of the secondary user.

3. The mobile device of claim 1, wherein the access control module is configured to generate a ranked list of the one or more device applications based at least in part on the user state and associated categorization of the respective device applications.

4. The mobile device of claim 3, wherein the access control module is configured to generate the ranked list of the one or more device applications to include captured screen shots of the visual content associated with the respective device applications.

5. The mobile device of claim 4, wherein the access control module is configured to generate a highlight reel of the captured screen shots of the visual content associated with the respective device applications.

6. The mobile device of claim 1, wherein the access control module is configured to assess similar visual content or similar audio content based at least in part on categorization of the one or more device applications, and at least one of restrict or allow the similar visual content or the similar audio content based on assessment.

7. The mobile device of claim 6, wherein the access control module is configured to recommend allowed visual content that is assessed similar to the visual content or the audio content of the device application categorized as allowed.

8. The mobile device of claim 1, wherein the access control module is configured to develop an acceptable content list specific to the secondary user, the acceptable content list including at least one of allowable visual content or allowable audio content.

9. The mobile device of claim 1, wherein the access control module is configured to generate an emotional ranking associated with the one or more device applications based at least in part on the user state of the secondary user accessing the respective device applications.

10. The mobile device of claim 9, wherein the access control module is configured to merge the emotional ranking that is associated with the one or more device applications with a different emotional ranking received from another device.

11. A method, comprising:

executing one or more device applications configured to at least one of display visual content or emit audio content in a secondary user mode of device operation, the secondary user mode being initiated based on a primary user sharing a mobile device with a secondary user;

detecting one or more user states of the secondary user accessing the one or more device applications in the secondary user mode; and at least one of:

categorizing a device application as restricted based on a user state indicating a destructive emotional response of the secondary user to the visual content visual content being displayed or the audio content being emitted; or categorizing the device application as allowed based on the user state indicating a constructive emotional response of the secondary user to at least one of the visual content being displayed or the audio content being emitted.

12. The method of claim 11, wherein the user state of the secondary user is detected as at least one of an emotion of the secondary user, a physiological state of the secondary user, or a body posture of the secondary user.

13. The method of claim 11, further comprising:

generating a ranked list of the one or more device applications based at least in part on the one or more user states and associated categorization of the respective device applications.

14. The method of claim 13, wherein the ranked list of the one or more device applications is generated to include captured screen shots of the visual content associated with the respective device applications.

15. The method of claim 14, further comprising:

generating a highlight reel of the captured screen shots of the visual content associated with the respective device applications.

16. The method of claim 11, further comprising:

assessing similar visual content or similar audio content based at least in part on categorization of the one or more device applications, and at least one of restricting or allowing the similar visual content or the similar audio content based on assessment.

17. The method of claim 11, further comprising:

developing an acceptable content list specific to the secondary user, the acceptable content list including at least one of allowable visual content or allowable audio content.

18. The method of claim 11, further comprising:

generating an emotional ranking associated with the one or more device applications based at least in part on the one or more user states of the secondary user accessing the respective device applications.

19. A system, comprising:

one or more device applications configured to at least one of display visual content or emit audio content in a secondary user mode of operation of a mobile device, the secondary user mode being initiated based on a primary user sharing the mobile device with a secondary user;

an access control module implemented at least partially in hardware, the access control module configured to:

categorize one or more detected user states of the secondary user as one of constructive or destructive based on an emotional response of the secondary user to at least one of the visual content being displayed or the audio content being emitted; and generate an emotional ranking associated with the one or more device applications based at least in part on the one or more detected user states of the secondary user accessing the respective device applications.

20. The system of claim 19, wherein the access control module is configured to detect each of the one or more detected user states of the secondary user as at least one of an emotion of the secondary user, a physiological state of the secondary user, or a body posture of the secondary user.

* * * * *